Jan. 3, 1939.   S. CHAPLIN   2,142,884
METHOD OF JOINTING AND OF EFFECTING REPAIRS TO ELECTRIC CABLES
Filed Dec. 28, 1936   3 Sheets-Sheet 1
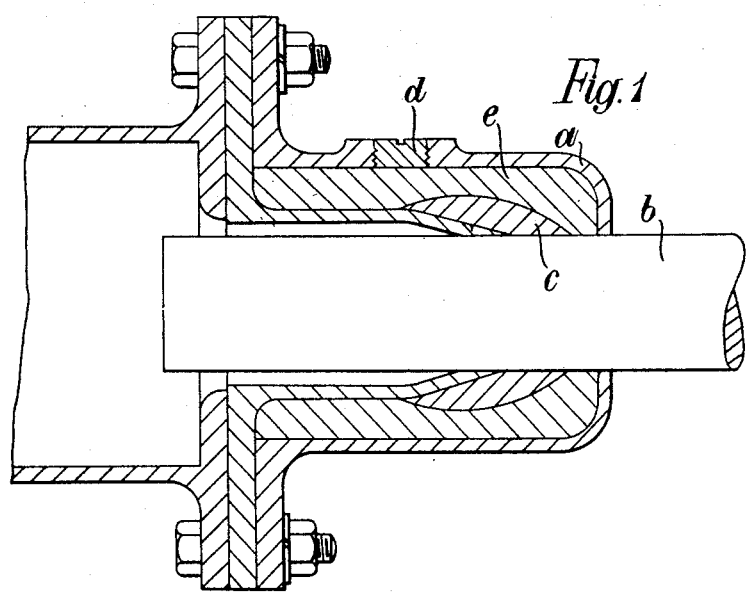
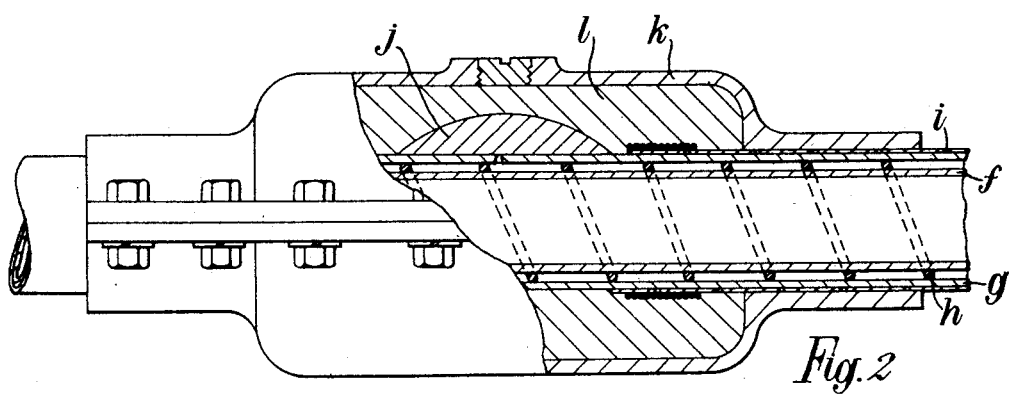

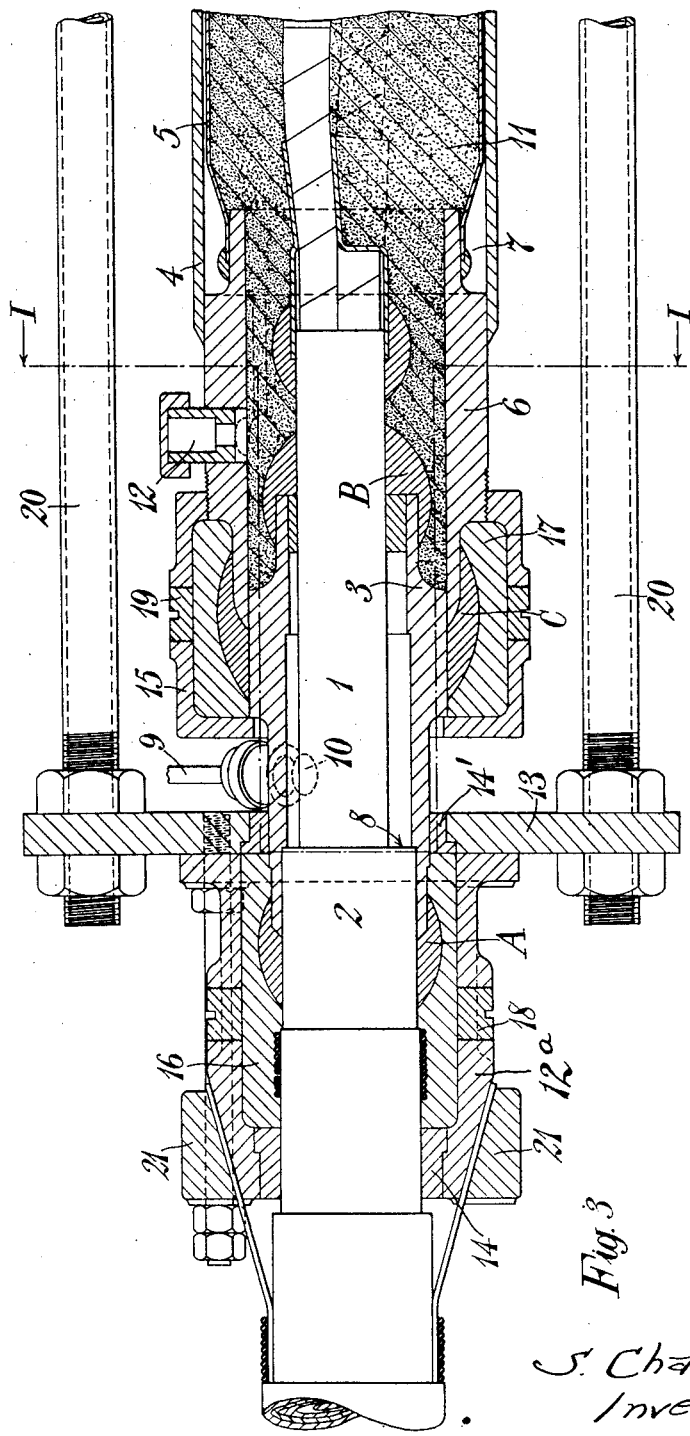

Patented Jan. 3, 1939

2,142,884

UNITED STATES PATENT OFFICE 2,142,884

METHOD OF JOINTING AND OF EFFECTING REPAIRS TO ELECTRIC CABLES

Stephen Chaplin, East Sheen, London, England, assignor to Protona A. G., Basel, Switzerland Application December 28, 1936, Serial No. 117,997
In Great Britain October 7, 1935

14 Claims. (Cl. 173—268)

This invention relates to an improved method of jointing, and of effecting repairs to, electric cables.

Owing to the practical difficulties of manufacture and transport it is usual for electric cables to be delivered to the site of installation in lengths which are often short in comparison with the length of the circuit which is required, and, therefore, it is necessary to provide suitable means for joining together individual lengths, and which will be such that the electrical and mechanical properties possessed by the cable as a whole will be retained or reproduced at the joint.

Among these properties is the imperviousness of the outer sheath which must be capable of preventing an ingress of moisture and of resisting without deformation the internal pressures which may be set up due to expansion of the impregnating compound under load or the fluid pressure due to the position of the cable on a gradient. The casing surrounding the joint and which may be constructed of lead, copper or other material can easily be made rigid and impervious. It is at the point where the casing of the joint meets the outer sheathing of the cable that special care is necessary. In those cases where the pressures within the cable are not expected to exceed, say 50 lbs. per square inch, no great difficulties are encountered, and a wiped joint between the lead sheath of the cable and a plumbing gland forming part of the rigid outer casing of the joint, is quite sufficient. Such a joint takes the form of a poultice of metal consisting of an alloy of lead and tin and known generally as plumbers' solder, which poultice is applied by hand by a process known as plumbing.

In a cable of the type wherein a pressure fluid or gas is contained within the lead sheath or sheaths, such an arrangement may not prove permanently satisfactory, as the pressure difference across the wiped joint is generally considerably in excess of 50 lbs. per square inch, sometimes in the order of 200 lbs. per square inch. In such cases it is necessary to provide a reinforcement for the wiped joint which will arrest any tendency it may have to deform, due to the internal pressure. A wire binding may be used for this purpose, but it is difficult, owing to its irregular shape, to give the wiped joint proper mechanical support at every point of its surface by means of such binding. The object of this invention is to provide an improved method of giving mechanical support to the wiped joint.

According to the present invention, the wiped joint in any part of a cable installation in which there is a great pressure difference across the joint, is reinforced by surrounding the said joint with a suitable casing, a space being left between the casing and the joint which is filled with a suitable filler capable of resisting the tendency of the wiped joint to deform under the great pressure difference across it, preferably a molten material which is solid at the temperature at which the cable is required to operate.

Various forms of carrying the invention into effect are illustrated, by way of example, in the accompanying drawings, in which:

Figure 1 is a sectional elevation of one application of the invention,

Figure 2 is an elevation, partly in section, of another application, and

Figure 3 is a sectional elevation of a third form of application,

Figure 4:
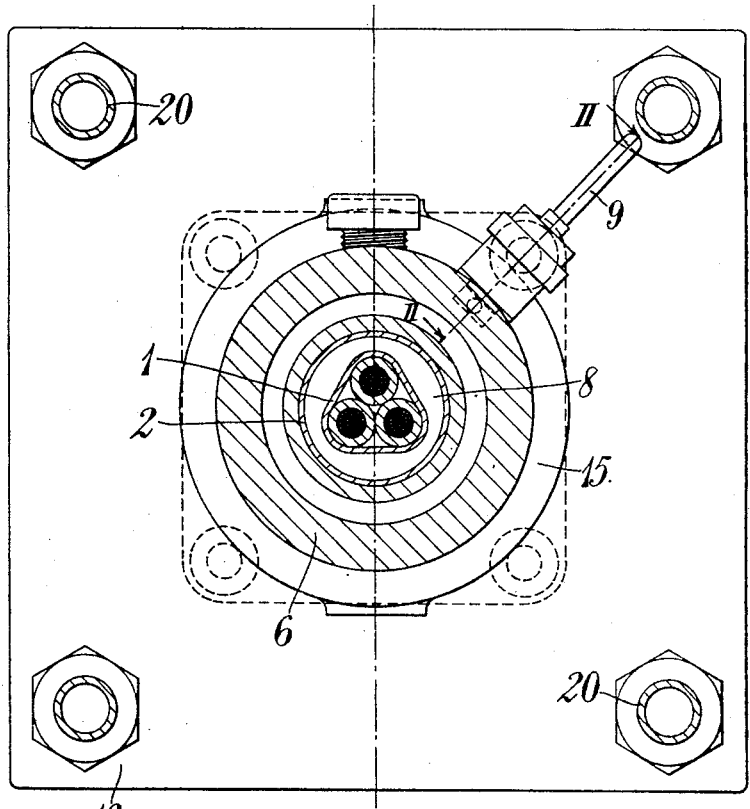

Figure 4 being a transverse section along the line I—I of Figure 3, and

Figure 5:
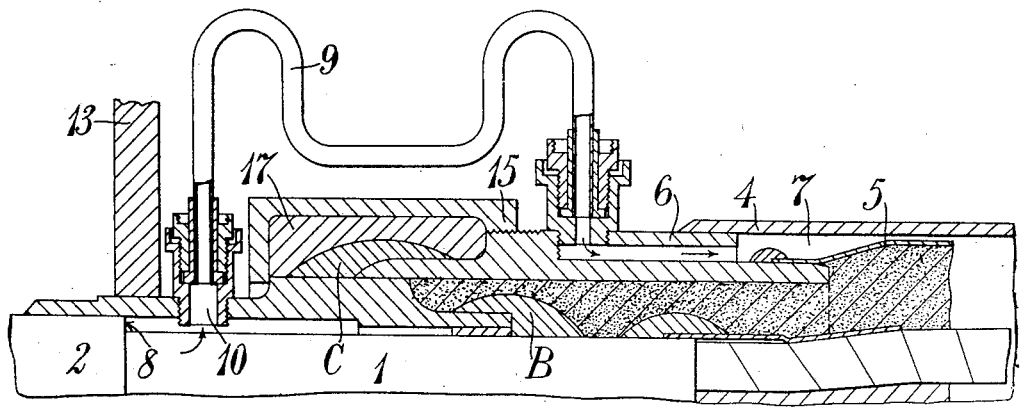

Figure 5 being a part sectional elevation in a plane along the line II—II in Figure 4.

Referring to the application illustrated in Fig. 1, use is made of a casing $a$, preferably of metal, fitted round the cable $b$, and forming a component of the rigid joint box, which casing is of sufficient mechanical strength to withstand, without deforming, an internal pressure equal to that within the cable. When in position, the casing completely encloses the wiped joint $c$, which it is desired to reinforce, but does not make contact with it, there being a clearance at all points, e. g., of about ⅜" to 1". Through an orifice $d$ provided at the top of the casing, the said clearance is filled with a material $e$ which is liquid at a temperature below that at which the metal constituting the wiped joint softens and solid at all temperatures at which the cable will be required to operate. In this way a reinforcement is provided for the wiped joint, at every point of its surface for the following reasons: Should the wiped joint $c$ expand it will compress the metal $e$ in the filled up clearance, and the metal in its turn will tend to deform; the tendency, however, is resisted by the outer casing $a$ and this resistance is immediately transmitted to the wiped joint $c$. The filling material $e$ may be a metallic alloy of lead, tin, bismuth and cadmium or another alloy, or use may be made of a suitable non-metallic substance, which when solid offers considerable resistance to compression.

Figure 2 illustrates the application of the invention to remedy a gas leak which might develop at some point on the circuit other than at a joint, for instance in a cable of the following construction. A number of insulated conductors are enclosed in a non-circular lead sheath $f$ surrounded by another non-circular lead sheath $g$, a steel wire $h$ being wrapped in open spiral around the inner sheath to act as a spacer between the two sheaths, and a steel strip $i$ being wrapped over the outer sheath in order mechanically to reinforce it.

Should now the outer sheath $g$ be accidentally punctured, according to the invention, first of all, the outer steel strip $i$ will be removed in the neightborhood of the puncture to enable it to be sealed with a wiped joint $j$. Thereupon, the necessary mechanical reinforcement will be given to the wiped joint and to that part of the cable from which the steel strip has been removed, by fitting a rigid metal casing $k$ around the cable and by filling the empty space around, and at the ends of, the wiped joint with a material $l$, and in the manner as above described.

A further specific example will now be described with reference to Figures 3 and 4, in connection with a joint box designed for use with a 33,000 volt pressure cable, wherein a gas under pressure is enclosed between two lead sheaths, the cable being of similar construction as the one just referred to and the space between the two lead sheaths being normally filled with gas under pressure.

The two ends of the cable are connected up as follows:—

In order to make connection between the joint sleeve and the inner and outer sheaths, 1 and 2 respectively of the cable, there is used, at each end of the joint, a cast copper cylinder 3. Those two cylinders are so designed that each one of them may be plumbed at one end to the outer lead sheath 2 of the cable and at their other end to the inner lead sheath 1, as is shown at A and B respectively in connection with one cylinder 3, making four plumbs in all. The joint sleeve is a metallic structure built up by the process known as bronze welding before being delivered to the site where the joint is to be made. It comprises firstly an outer or rigid copper cylinder 4 and secondly an inner or flexible copper cylinder 5. Flexibility is given to the latter by a series of flutings running parallel to its axis. Both of these cylinders 4, 5 are of approximately equal length and they are maintained in a position concentric to each other by welding at each end to cylindrical copper castings 6. These castings have an internal diameter of such size as to cooperate with the external diameter of the copper castings 3 which are already plumbed to the cable. The space 7 between the two sleeves 4, 5 is normally filled with gas and is in communication with the space 8 between the inner and outer sheaths 1, 2 of the cable by means of a pipe 9 communicating therewith through an opening 10 provided in the cast copper cylinder 3.

After the conductors have been suitably joined and insulated, the two copper cylinders 6 and the interconnecting concentric copper sleeves 4, 5, welded thereto to form one unit, are moved into position and plumbed with a wiped joint C to the other copper cylinders 3. The space 11 around the conductors enclosed by the flexible copper sleeve 5 and copper cylinders 6 is then filled with insulating compound admitted through an opening 12 provided in one of the copper cylinders 6. This space should now be completely occupied by the compound but if the ambient temperature falls the compound will contract. Owing to the flexibility of the inner sleeve 5, which is forced inwards by the gas pressure in the space 7 surrounding it, this contraction does not result in the formation of a partial vacuum. Conversely, should the temperature of the oil compound rise, the flexible sleeve 5 will expand, reducing the volume of the space containing the gas and forcing the latter back into the space 8 between the inner and outer sheaths 1, 2 and thus along the cable. It will be seen that the pressure of the compound in the space 11 around the conductors is always maintained equal to the pressure of the gas in the space 8 between the two sheaths 1, 2 and in the space 7 between the two copper sleeves 4, 5.

From the above, it will be seen that since the pressure in the space 7 between the two copper sleeves 4, 5 is equal to the pressure in the space 11 surrounding the conductors, the pressure in the space 8 between the inner and outer lead sheaths will be equal to the pressure in the space 11 surrounding the conductors, so that the wiped joint B provided between the copper cylinder 3 and the inner sheath 1 will not have any pressure difference across it and, therefore, can be considered to be permanently satisfactory. However, this is not the case with the wiped joint A between the copper cylinder and the outer sheath, nor with the wiped joint C between the copper cylinders 3 and 6, across which joints there is a difference in pressure equal to that which exists between the atmosphere and the gas in the space between the inner and outer sheaths 1, 2. The tendency which these wiped joints may have to deform owing to this pressure difference is counteracted in the present invention by the provision of suitable reinforcements for the wiped joints.

With this end in view, use is made, in connection with the wiped joint A, of a preferably cast steel cylinder 12a and plate 13, and of two pairs of split brass bushes 14, 14'. In the case of the wiped joint C use is made of a brass casting 15 screwed on to the copper cylinder 6. When these parts are assembled, spaces 16 and 17 are respectively left around the wiped joints A and C to be filled with a material as above described, for which purpose the said cast cylinders are provided with orifices through which they are filled with the said material, screw plugs 18, 19 being fixed in position after the liquid has been poured in.

In order to complete the assembly of the joint, the plates 13 are coupled together by four preferably steel tubes 20. These in conjunction with armoured clamps 21 relieve the joint of any tension which might exist in the cable. The complete joint may be enclosed in a suitable casing filled with a bituminous compound to prevent ingress of moisture and possible corrosion.

I wish it to be understood that the details of reinforcing the wiped joint in the manner described can be varied without in any way departing from the spirit of the invention, and that the invention may be applied to any part of a cable installation in which there is a great pressure across the wiped joint.

What I claim is:—

1. A method of increasing the resistance of a wiped joint of a cable installation to deformation under the high operating pressure maintained therein consisting in reinforcing the wiped joint by surrounding it with a casing capable of withstanding said high operating pressure in such a manner as to leave a space between the casing and said joint and filling the space with a filler capable of resisting the tendency of the wiped joint to deform under the great pressure difference across it.

2. A method as claimed in claim 1 in which the filler consists of a material which is applied in molten state by which is solid at the temperature at which the cable is required to operate.

3. A method as claimed in claim 1 in which the filler consists of a material which is liquid at a temperature below that at which the metal constituting the wiped joint softens.

4. A method as claimed in claim 1 in which the filler consists of a metallic alloy.

5. A method as defined in claim 1 in which the filler consists of an alloy of lead, tin, bismuth and cadmium.

6. In a cable installation, two lead sheaths arranged one within the other and enclosing gas under pressure between them, a cylinder, a wiped joint connecting one end of the said cylinder with the inner lead sheath, a wiped joint connecting the other end of the cylinder with the outer lead sheath, a casing surrounding the second mentioned wiped joint and disposed in spaced relation thereto, and a filler occupying the space between the casing and the wiped joint for resisting tendency of said joint to deform under a pressure difference across it.

7. Means for reinforcing against deformation of a wiped joint of a cable installation containing pressure fluid, comprising a substantially rigid casing capable of withstanding the high operating pressure of the cable, said casing surrounding the joint and disposed in spaced relation thereto, and a filler capable of resisting the tendency of said joint to deform under the pressure difference across it and occupying the space between said casing and the wiped joint.

8. In a cable installation including a cable of the pressure fluid type provided with inner and outer lead sheaths, a joint sleeve filled with an insulating compound surrounding the cable, said sleeve including a middle portion constituted by a double wall filled with fluid under pressure, the inner wall being flexible, the end portions of the joint sleeve being constituted by cylinders, a wiped joint connecting one end of each cylinder with the outer sheath of the adjacent cable, a casing surrounding each said wiped joint and disposed in spaced relation thereto, and a filler occupying the space between the casing and the wiped joint.

9. An installation as claimed in claim 8, characterized in that said sleeve includes means sealing the opposite end of each cylinder to the inner sheath of the related cable, and means establishing communication between said double walls and the fluid space of the fluid pressure cable.

10. An installation as claimed in claim 8, characterized in that said sleeve includes a casting inserted in the ends of said double wall and overlapping the adjacent cylinder, means within said casting sealing the opposite end of said cylinder to the inner sheath of said cable, a wiped joint arranged over the overlapping portions of the casting and cylinder, a casing surrounding the last mentioned wiped joint and disposed in spaced relation thereto and a filler occupying the space between the casing and the wiped joint.

11. Reinforcing means as claimed in claim 8 in which the filler consists of a material which is applied in molten state but which is solid at the temperature at which the cable is required to operate.

12. Reinforcing means as claimed in claim 8 in which the filler consists of a material which is liquid at a temperature below that at which the metal constituting the wiped joint softens.

13. Reinforcing means as claimed in claim 8, in which the filler consists of a metallic alloy.

14. Reinforcing means as claimed in claim 7 in which the filler consists of an alloy of lead, tin, bismuth and cadmium.

STEPHEN CHAPLIN.